Patented Nov. 28, 1933

UNITED STATES PATENT OFFICE 1,936,872

CHEESE PRODUCT AND METHOD OF MAKING THE SAME

Felix M. Frederiksen, Milwaukee, Wis., assignor, by mesne assignments, to Premier-Pabst Corporation, a corporation of Delaware No Drawing. Application March 14, 1930
Serial No. 435,969

3 Claims. (Cl. 99—11)

The invention relates to a new cheese product and the process of making the same.

The so-called "sterilized" or "pasteurized" cheese products produced today are made by a blending together of cheese of different sizes and ages, subjecting the same to the action of heat to form a homogeneous mass and at the same time destroy putrefactive bacteria and bacteria tending to otherwise spoil the cheese so that the same may be kept under proper conditions for relatively long periods of time. In producing this product on a commercial scale it has been found necessary to employ so-called emulsifiers which are added to the cheese either before or during the cooking or heating process to prevent the cheese mass from disintegrating, that is, the fats and casein from separating. The common emulsifiers used for this purpose are alkaline salts, such as sodium citrate, sodium lactate, di- or tri-sodium phosphate and sodium tartrate. While the addition of these emulsifiers has the desired effect of preventing the disintegration of the cheese, the product produced by their addition, regardless of any statements to the contrary, does not have the same texture as the original cheese, but has the objectionable characteristic of being sticky or gummy and the original flavor of the cheese is somewhat impaired. The object of the present invention is to so treat the emulsified pasteurized cheese of the prior art as to restore the original texture of the cheese and improve the flavor so that a new and better cheese product is produced over that now known to the art. More particularly, the invention has for its object to treat the emulsified cheese with a small amount of soluble alkaline earth salt, such as calcium or magnesium chloride, while the cheese is in a plastic condition and thereby restore the original cheese texture without changing the emulsion by restoring the balance of alkali salts to that present in the original cheese before processing.

One specific example of carrying out my improved process is as follows: The cheese is processed in a manner now well known to the art, for example, the cured cheese or cheeses is or are comminuted, as by passing the same through a suitable grinding machine, and introduced into a cooling kettle equipped with suitable agitating devices and heated therein, while being stirred, to such a temperature and for such a period as to pasteurize the product; for example, the cheese is heated to a temperature of one hundred and forty-five degrees Fahrenheit and kept at this temperature for a period of fifteen minutes. Either before or during the heating the emulsifying agent, such as sodium citrate, sodium lactate, di- or tri-sodium phosphate or sodium tartrate, is added in quantities now well known to the art and usually not exceeding two to three per cent. by weight. Before the cheese is discharged from the kettle for packaging or canning a small amount of a soluble alkaline earth salt, such as calcium or magnesium chloride is added to the cheese mass and thoroughly mixed therewith by suitable stirring or agitating apparatus which in the present example is preferably that used in the cooking process. The amount of soluble alkaline earth salt added may be, for example, from one-half of one per cent. to one per cent. by weight and when the same has been thoroughly incorporated in the plastic cheese mass the cheese mass is discharged from the cooking kettle and subjected to the usual packaging operations, as, for example, the packaging of the cheese in suitable tinfoil-lined containers or the pouring of the cheese into cans which are thereafter covered and hermetically sealed.

As a result of the process a new cheese product is provided whose texture is like that of the original cheese and not the gluelike texture of the usual processed cheese. Furthermore, the flavor of the cheese so treated is improved over that of the usual processed cheese.

The process is not to be limited to any particular cheese but may be used in connection with any processed cheese, such as Cheddar, Swiss, brick or Camembert, or mixtures of these cheeses, nor is it to be limited to any particular process for producing an emulsified, sterilized or pasteurized cheese.

What I claim as my invention is:

1. The process of improving the texture of emulsified, processed cheese to which a sodium salt emulsifier has been added, which consists in thoroughly mixing into the emulsified cheese mass—while in a plastic condition and after the emulsifier has served its purpose—a small amount of a highly soluble edible alkaline earth salt.

2. The process of improving the texture of emulsified, processed cheese to which a sodium salt emulsifier has been added, which consists in thoroughly mixing into the emulsified cheese mass—while in a plastic condition and after the emulsifier has served its purpose—approximately one per cent. by weight of calcium chloride.

3. The process of improving the texture of emulsified, processed cheese containing a sodium salt emulsifier, which consists in mixing into the emulsified cheese—while in a plastic condition and after the emulsifier has served its purpose, shortly before permitting the cheese to cool—approximately one per cent. by weight of magnesium chloride.

FELIX M. FREDERIKSEN.